March 2, 1971  H. TACHECI ET AL  3,567,540
SPLICING OF POLYESTER FILMS
Filed Nov. 15, 1967

INVENTORS:
HEINRICH TACHECI, MANFRED SANDER, PEDRO PINTASKE.

United States Patent Office 3,567,540
Patented Mar. 2, 1971

3,567,540
SPLICING OF POLYESTER FILMS
Heinrich Tacheci, Bad Homburg, Manfred Sander, Kelkheim, and Pedro Pintaske, Waldacker, Germany, assignors to Agfa-Gevaert Aktiengesellschaft, Leverkusen, Germany
Filed Nov. 15, 1967, Ser. No. 683,251
Claims priority, application Germany, Nov. 28, 1966,
A 54,196
Int. Cl. B65h 69/02
U.S. Cl. 156—157
8 Claims

ABSTRACT OF THE DISCLOSURE

Polyester films such as moving picture film of polyethylene terephthalate, are spliced by swelling the faces to be joined with a coumarin, a partially etherified polyhydric phenol, or a partially etherified polyhydric naphthol, and then pressing these faces together for not more than a few seconds at 100 to 180° C. Such splicing does not cause shrinkage and the swelling agents are innocuous.

Figure 1:
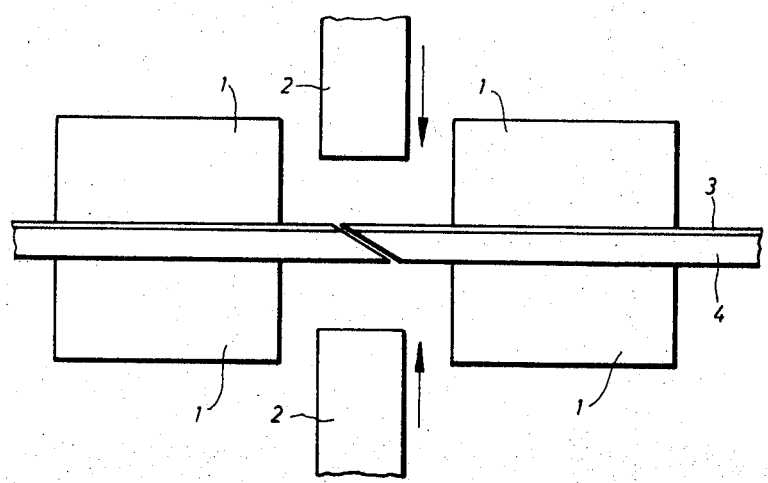

This invention relates to a process for splicing films of aromatic polyesters by applying a suitable swelling agent to the surfaces to be spliced, followed by joining at elevated temperature. The invention is especially applicable to the splicing of motion picture films having a polyester support, polyethylene terephthalate in particular.

Stretched polyester material cannot be directly spliced by heating above the point at which it melts, because the material undergoes considerable shrinkage as it is heated up to that temperature. (The melting point of polyethylene terephthalate is above 260° C.) Although sealing without shrinkage is possible by the use of ultrasonics, this method is too expensive and for this reason cannot be used by amateur photographers.

Problems are involved in the use of reactive adhesives which, in typical all-purpose adhesives, stick not only to the polyester film but also to the instrument being used. In addition, there are only relatively few reactive adhesives which can be used for aromatic polyesters. Even this small number require long hardening times and only give splices of moderate strength.

Adhesives used for aromatic polyesters include polymers which adhere satisfactorily to polyesters and whose melting point is below the temperature critical for dimensional stability (180° C. in the case of polyethylene terephthalate). The shear strength of splices obtained in this way is only satisfactory in a few cases, whilst their resistance to high temperatures under tensile stressing (for example, in the case of spliced motion picture films) is without exception insufficient.

Swelling agents for polyester material in general and polyethylene terephthalate in particular have been proposed for a variety of purposes. Unfortunately, the degree of swelling obtained is insufficient for splicing, or the swelling agents themselves cannot be used for other reasons. Halogenated acetic acids, for example, are effective solvents but at the same time are highly corrosive, whilst aniline and its substitution products deleteriously effect polyesters by chemical decomposition. Derivatives of aniline are, moreover, not useful for physiological reasons. Phenols are unsuitable on account of their unfavourable odour. These disadvantages also attend the substances described in U.S. Pat. No. 2,849,359 which are used as adhesives for polyester-based photographic films. None of these known adhesives meet practical requirements.

It is an object of the present invention to provide substances intended in particular for splicing photographic films having a polyester support, which substances cause superficial swelling to such an extent that splicing can be completed within a matter of seconds at temperatures below 180° C. without depriving the film to be spliced of its dimensional stability. Finally, the adhesive should be free of any unpleasant odours, physiologically unobjectionable and must not impair the photographic properties of the films.

Figure 2:
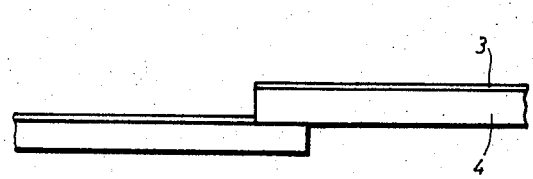

These and other objects of this invention will be better understood upon consideration of the following description taken together with the accompanying drawings in which:

FIG. 1 is an edge-on view illustrating high speed splicing of ends of photographic films according to this invention and showing clamps and dies of the apparatus, and FIG. 2 is an edge-on view of films illustrating modification of the high-speed splicing of this invention.

We now have found that aromatic polyester material can be spliced by coating it with a partially etherified polyphenol or naphthol and/or a coumarin as swelling agent, followed by pressing under heat. In this context, partially etherified polyhydric phenols or naphthols are substitution products of benzene or naphthalene which contain at least one, preferably one or two phenolic hydroxyl groups and at least one preferably only one phenol ether group.

Suitable ether groups include alkyl radicals, preferably with up to 5 carbon atoms, and radicals of the phenyl or naphthyl series, preferably phenyl.

In addition, the aromatic ring may contain other substituents, for example, alkyl preferably with up to 5 carbon atoms, aryl, preferably phenyl, halogen such as fluorine, chlorine or bromine and others.

The following compounds are particularly suitable: resorcinol monomethylether, catechol monoproplyether, phloroglucinol dimethylether, phloroglucinol monomethylether, 5-methyl resorcinol monomethylether, 4-chlororesorcinol monomethylether, 4-chloro-phloroglucinoldimethylether, 3-hydroxy-diphenylether, 2-hydroxy-diphenylether, 1-hyroxy-5-methoxynaphthalene, and 2-hydroxy-3-methoxynaphthalene.

Suitable coumarins include coumarin itself, 1-thiocoumarin, 2-thiocoumarin and substitution products of these compounds. Suitable substituents include, for example, alkyl or alkoxy preferably with up to 5 carbon atoms, halogen such as fluorine, chlorine, bromine and the like.

The following compounds, for example, are suitable: 4-methoxycoumarin, 7-methoxycoumarin, 4-chlorocoumarin, 3-chlorocoumarin, 7-chlorocoumarin, 4-methylcoumarin, and 7-methoxy-2-thiocoumarin.

Films or foils of aromatic polyesters preferably with a high aromatic component content can be spliced with the aforementioned substances. The splicing method of the invention is particularly suitable for polyesters of terephthalic acid or isophthalic acid, and straight-chain or branched glycols in particular ethylene glycol. Splicing is preferably carried out with an overlap, whereby even very small overlaps yield joints of high strength. As shown in FIG. 1, the wedge-shaped splices normally used for cinematographic films can also be applied. For this purpose, the ends of the film to be joined are shaved off, form a wedge so that the overall thickness of the splice obtained is equal to the thickness of the film. The width of splices of this kind is little more than a millimeter.

The tensile strength of the splices made by the inventive method ranges between 80% of the strength of the unspliced film and the tensile strength of the film itself.

It is self-explanatory that with the process of the invention two surfaces of polyester are spliced. If the photographic film to be spliced is coated on one side with a layer of another material, for example, the image-carrying gelatin layer, that part of the coating projecting into the area at which the splice is to be made has to be removed beforehand. This may be done either mechanically or chemically. The swelling agent is then applied either to one or to both surfaces to be spliced, by brush coating, spraying, immersion or any conventional method.

One of the aforementioned substances or a mixture of several of them can be applied. The swelling agent may be diluted with a readily volatile solvent, for example, acetone, methanol, dioxane, methylene chloride and so on. This is particularly desirable in the case of swelling agents which are solid at room temperature. It is occasionally of advantage to add high boiling solvents (for example, dimethyl formamide, dimethyl sulphoxide, butyrolactone, N-methyl pyrrolidone, isophorone, benzyl alcohol and so on).

After the swelling agent has been applied, the surfaces to be spliced are placed on top of one another and heated under slight pressure in a suitable apparatus. With some of the aforementioned swelling agents, a temperature of 170° C. is required to obtain a good splice, whilst with other, temperatures as low as 120° C. to 140° C. are sufficient. The heating time depends on the thickness of the film. In most cases periods of only a few seconds are sufficient. Heating may be carried out as required, for example, by means of a heating plate, infrared heating and so on.

The amount of the swelling agent to be applied should be sufficient to yield at least a monomolecular layer on the areas to be spliced. Higher amounts are not critical since excessive quantities are squeezed out during the heat sealing operations.

EXAMPLE 1

An exposed and processed regular 8 mm. motion-picture film (perforated along one side) on a polyethylene-terephthalate support, was cut in a conventional splicing press and shaved to give wedge-shaped ends. The shaved edge of one of the two ends of the film to be spliced was coated with a solution of phloroglucinol dimethylether in methylene chloride (1:1) using a fine brush. The ends of the film were then laid on top of one another between clamps 1 (compare FIG. 1) and pressed together under slight pressure for about 5 seconds by means of the metal dies 2 heated to 170° C. In FIG. 1, 3 denotes the photographic layer containing the image, and 4 the polyethylene terephthalate support. The splice obtained was optically clear and showed outstanding mechanical strength. Phloroglucinol dimethylether is almost odourless.

EXAMPLE 2

The ends of the film to be spliced were not planed at an oblique angle as described in Example 1, but only that part of the image-carrying layer at the surfaces to be spliced was scraped away. This method is shown in FIG. 2. A concentrated solution of coumarin in dioxane was used as the swelling agent. The bonds obtained at 170° C. are satisfactory. Coumarin does not have an unpleasant idour.

EXAMPLE 3

A film sample was prepared as described in Example 1. A mixture of coumarin and phloroglucinol dimethylether was used as swelling agent. A temperature between 150° C. and 160° C. was sufficient to obtain a good splice. The adhesive mixture has a pleasant odour.

EXAMPLE 4

A film sample was prepared as described in Example 1. 3-hydroxydiphenylether, which is completely odourless, was applied undiluted as swelling agent. Excellent splices were obtained after pressing at 160° C. to 170° C.

EXAMPLE 5

A film sample was prepared as described in Example 1. Catechol monopropylether, which has a weak phenol odour, was used as swelling agent at 170° C. Satisfactory results were obtained.

EXAMPLE 6

The procedure was as described in Example 1, except that 5-methylresorcinol monomethylether in methylene chloride (1:1) was used as swelling agent. The agent was applied to both edges of the film.

EXAMPLE 7

The procedure was as described in Example 1, except that 1-hydroxy-5-methoxy naphthalene in methanol (1:1) was used as swelling agent. The agent is odourless.

EXAMPLE 8

The procedure is as described in Example 1, except that a concentrated solution of 4-chlorocoumarin in dioxan, to which 5% by weight of N-methyl pyrrolidone had been added, was used as swelling agent. The odour is pleasant.

EXAMPLE 9

The procedure was as described in Example 1, except that a concentrated solution of 1-thiocoumarin in dioxan was used as swelling agent. The odour is pleasant.

The splices obtained in accordance with Examples 1 to 9 were tested as described in the following.

Tear strength

The film sample was clamped in a tear-strength testing machine (length between grips 50 mm.) and torn at a speed of 100 mm./minute. Whereas unspliced film gives tear strengths of around 6.5 kg. the spliced samples reached values of, on average, 5.8 kg.

Shear strength

To determine shear strength, an apparatus was used in which the spliced film sample was guided through 180° around an 8 mm. diameter roller under a tensile load of 1 kg. The splice has to be able to withstand at least 100 forwards and backwards movements of the splice over the roller with an amplitude of 4 cm. and a frequency of 2 c./s. (cf. performance specification for 8 mm. motion picture film splices). The splices obtained in accordance with Examples 1 to 9 were all able to withstand 10,000 forwards and backwards movements.

Resistance to heat

The splices must be able to withstand a temperature of 80° C. for 5 minutes under a tensile load of 1 kg. The splices obtained in accordance with Examples 1 to 9 remained undamaged even when the time is lengthened to 1 hour and the temperature increased to 170° C.

We claim:
1. In the process of splicing polyester film by applying a swelling agent to the faces to be spliced and then hot pressing these faces together, the improvement of applying a swelling agent selected from the group consisting of a partially etherified polyhydric phenol, a partially etherified polyhydric naphthol, and a coumarin, and then hot pressing together the faces to which the swelling agent is applied at a temperature between 100° and 180° C. while maintaining the dimensional stability of the film whereby a splice is provided free from unpleasant odor and having a tensile strength not substantially less than the unspliced film.

2. The combination of claim 1 in which the swelling agent is an alkyl or phenyl ether of a dihydric or trihydric phenol or of a dihydric or trihydric naphthol, and the hot-pressing is at a temperature between 120 and 180° C.

3. The combination of claim 2 in which the phenol is catechol, resorcinol or phloroglucinol and the naphthol is dihydroxy naphthalene.

4. The combination of claim 3 wherein the swelling agent is a mono or dialkyl ether of phloroglucinol, the alkyl groups of which contain up to 5 carbon atoms.

5. The combination of claim 1 wherein the swelling agent is coumarin, an alkoxy substituted coumarin, an alkyl-substituted coumarin or a thiocoumarin, and wherein the hot pressing is at a temperature between 120 and 180° C.

6. The combination of claim 1 in which the film is moving picture film and the splice is a tapered butt splice.

7. The combination of claim 6 in which the spliced film has a tensile strength at least 80% of the unspliced film.

8. The process of claim 1 in which the hot pressing is effected for no more than about five seconds.

References Cited
UNITED STATES PATENTS

| | | | |
|---|---|---|---|
| 1,981,141 | 11/1934 | Caprio | 156—307 |
| 2,849,359 | 5/1955 | Smith | 156—308 |
| 3,074,789 | 1/1963 | Krogh | 156—157 |
| 3,409,493 | 11/1968 | McIntyre et al. | 156—307 |

CARL D. QUARFORTH, Primary Examiner

B. H. HUNT, Assistant Examiner

U.S. Cl. X.R.

156—157, 307, 308